(No Model.)
J. M. ELDER.
WHEEL FENDER FOR VEHICLES.
No. 534,868. Patented Feb. 26, 1895.
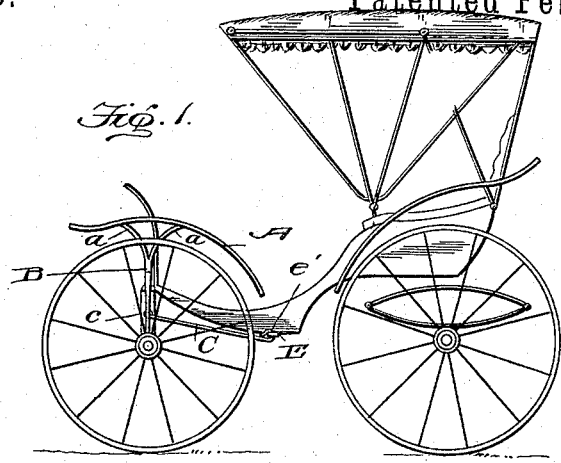
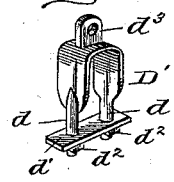
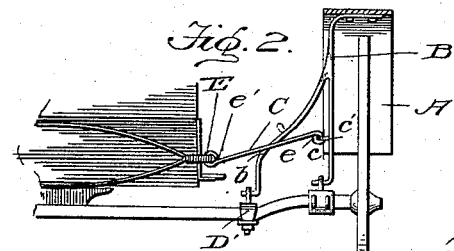
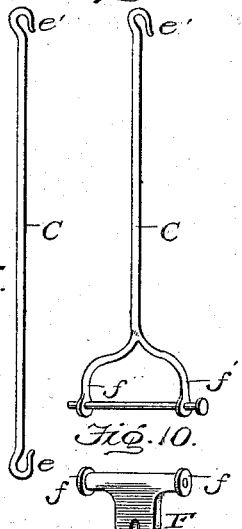
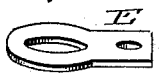
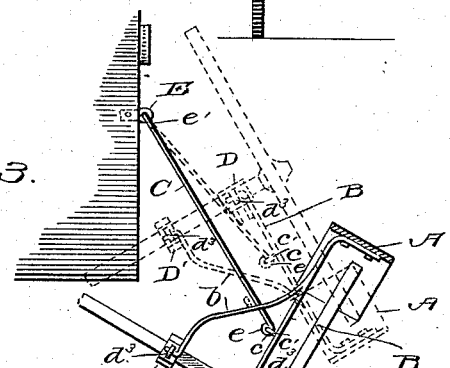
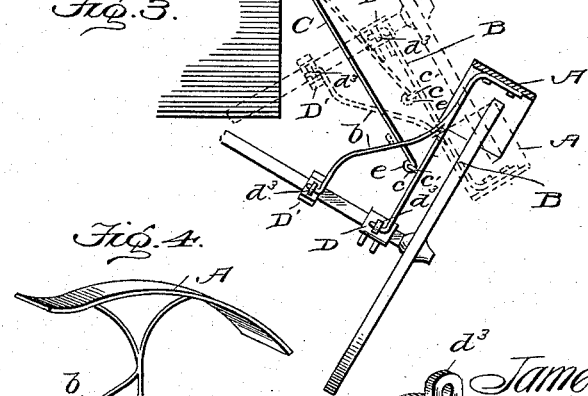
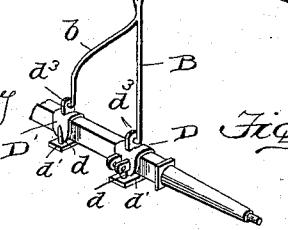
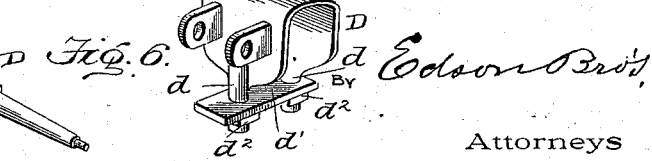
Witnesses:
James M. Elder.
Inventor.
By Edson Bro's
Attorneys

UNITED STATES PATENT OFFICE.

JAMES M. ELDER, OF INDIANAPOLIS, INDIANA.

WHEEL-FENDER FOR VEHICLES.

SPECIFICATION forming part of Letters Patent No. 534,868, dated February 26, 1895.

Application filed May 24, 1894. Serial No. 512,345. (No model.)

*To all whom it may concern:*

Be it known that I, JAMES M. ELDER, a citizen of the United States, residing at Indianapolis, in the county of Marion and State of Indiana, have invented certain new and useful Improvements in Automatic Fenders for Vehicles; and I do hereby declare the following to be a full, clear, and exact description of the invention, such as will enable others skilled in the art to which it appertains to make and use the same.

The object of the present invention is to provide a novel construction of fender designed primarily for use on front wheels of vehicles which will be automatically adjusted or controlled, that is, without any attention whatever on the part of the driver or occupant of the vehicle, in a manner to shield the person's clothing from contact with the wheels in the act of getting in or leaving the vehicle-body, and which fender is thrown forward and downward out of the way in turning the front axle to cause the wheel at one end of said axle to bear against the rub iron.

With these and such other ends in view as pertain to my invention, it consists, broadly stated, of a movable fender sustained normally over a vehicle wheel and connected with a vehicle-body or running-gear in a manner to impart to the fender a downward and rearward motion when the front axle is turned to throw the wheel away from the body, but when the axle is turned in the reverse direction and the wheel moved inward toward the rub iron, this fender is forced forward and downward in advance of the wheel to permit the latter to approach or bear against the rub iron without interference from the fender.

In the preferred embodiment of my invention, the fender is rigidly fastened to the upper forked end of a carrying arm or standard which is pivoted or hinged at its lower end to the front axle, and this pivoted swinging arm or standard is connected by a rod or stem with a body or running gear of the vehicle. This rod serves to sustain the fender normally over the upper side of the wheel when the front axle is parallel to the rear axle; to pull the fender backward and sustain it in rear of the wheel to protect the rider from contact therewith when the front axle is turned in one direction, and to force the fender forward and in front of the wheel as the axle is turned in the opposite direction; and the invention further consists in the peculiar construction and combination of parts which will be hereinafter more fully described and claimed.

To enable others to understand my invention, I have illustrated the preferred embodiment thereof in the accompanying drawings, forming a part of this specification, in which—

Figure 1 is a side elevation of my fender showing it applied to one style of vehicle. Fig. 2 is a front elevation, showing in outline the spring and body, and illustrating the construction of the fender and its supporting and adjusting devices. Fig. 3 is a detail plan view, illustrating by full lines the position of the fender when the wheel is turned away from the body, and by dotted lines the position of the fender when the wheel is turned toward the rub iron. Figs. 4 to 10, inclusive, are details of parts of the invention.

Like letters of reference denote corresponding parts in all the figures of the drawings, referring to which—

A designates the fender, B the standard or arm, and C the operating rod. The standard A is constructed or formed, preferably, of a single wrought metal piece, although this is not essential, and the upper end of said standard is forked or bifurcated to provide the diverging arms $a, a$ to which the fender A is rigidly fastened in any desirable way. The standard or arm B is braced and strengthened by the strut or arm $b$ which is rigidly united to the standard at an intermediate point of the length thereof, and this brace, $b$, diverges from the standard or arm B, as shown by Fig. 2. The lower ends of the standard B and its rigidly fastened brace $b$, are pivoted or hinged to the front axle of the vehicle, and in the preferred embodiment of my invention the standard and brace are pivotally connected to the clips D, D', as shown in Fig. 2, said clips being independently clasped to the axle.

In Fig. 7 of the drawings, I have shown one of the clips, D, which is bent from a single piece of metal to form the threaded legs $d$, on which is fitted the plate $d'$, and the clamping nuts $d^2$ by which the clips can be tightly clamped on the axle; and the clip is further provided, at its upper end, with the vertical perforated ear $d^3$ which receives the hook on one end of the operating rod C.

In Fig. 6 of the drawings, I show a construction by which the arm or standard B and one of the thills of the vehicle can be connected by a single clip to the axle, which clip may be used to pivotally connect the thill and fender in lieu of two independent clips, one for the thill and the other for the fender-arm B.

The fender A is of the curved or arc shaped form shown by the drawings, and it may be made of metal, leather, or any other material suitable for the purpose, and finished in any desirable way.

The connecting rod C has one end thereof pivotally or loosely connected to the standard or arm B, as at $c$, or to the brace $b$ thereof by means of the loop or eye $c'$ indicated by dotted lines in Fig. 2 of the drawings; and the opposite end of the rod C is connected either to the body or running gear of the vehicle.

In Figs. 5 and 8 of the drawings, I have illustrated one construction of the rod designed especially to be connected to the body; and the ends of this rod are made with the hooks $e$, $e'$, one of the hooks, $e$ being fitted in the eye or loop, $c$ or $c'$, on the arm B or its brace, and the other hook, $e'$, fitted in an eye of the plate E which is firmly fastened, by a screw or bolt, to the side of the vehicle body as shown more clearly by Figs. 1 and 3. The connecting rod C may, however, be attached to a part of the running gear of the vehicle, as for instance, to the side and front spring bar, by a construction of the rod and plate shown in Figs. 9 and 10.

The plate F is fastened at one end to a spring bar, and its other end is enlarged to provide the lugs $f$ which fit between the forked arms $f'$ on the end of the rod C, a pivotal bolt being passed through the lugs and the arms to pivotally connect the rod C to the fixed plate F. This construction is particularly designed to connect the rod C in a position parallel to the dash board of the vehicle body, although it may be used to attach the rod to a part of the running gear.

This being the construction of my improved fender, the operation may be described as follows:—The fender is held by the rod C in a position over the top side of the front wheel when the front axle is parallel to the rear axle as shown very clearly by Fig. 1 of the drawings. When the axle is turned at an angle to throw the wheel away from the body to permit the person to get in or out of the vehicle, the rod C pulls the arm B and fender A backward and downward, and it sustains the fender in a position in rear of the front wheel as shown by full lines in Fig. 3, so that a person can easily get in or out of the vehicle without brushing against the wheel, thus obviating the annoyance and injury to the clothing of having them soiled by contact with the wheel. As the axle is turned in the opposite direction and to the reverse angular position, to force the wheel inward toward the rub iron on the body, the rod C pushes the arm B and fender A forward and sustains the same in position in advance of the wheel, so as to be out of the way of the wheel approaching or striking the rub iron.

Although I have only shown and described my fender as applied to the front axle over one of the wheels thereon, yet it is evident that fenders may be applied over both front wheels of the vehicle.

My fender can be applied to or used in connection with any form of vehicle, but to enable others to understand the invention it is shown, as an illustration, in connection with one type of vehicle known to those skilled in the art as a "phaeton."

The fender is distinguished from prior devices of this class from the fact that its position over the front wheel is wholly automatically controlled without any attention or adjustment on the part of the driver, and so far as I am aware an automatically adjusted fender pivoted on the axle to swing endwise back or forth over a wheel and connected with the vehicle body or running gear by a rod which sustains it in front or rear of the front wheel, is broadly new.

I am aware that changes in the form and proportion of parts, in the details of construction, and in the mode of applying my automatic fender to the axle and vehicle body or running gear, can be made by a skilled mechanic without departing from the spirit or sacrificing the advantages of my invention, and I therefore reserve the right to make such modifications and alterations as fairly fall within the scope of my invention.

Having thus fully described my invention, what I claim as new, and desire to secure by Letters Patent, is—

1. In an automatic fender for vehicles, the combination with a pivoted front axle, and a vehicle-body, of clips fastened to said pivoted front axle, a standard or support provided with a brace and pivoted to said clips, a fender-shield rigid with said standard and movable therewith partially around the circumference of a wheel on said pivoted front axle, a rod attached to said standard, and means for attaching said rod to the vehicle-body, whereby the movement of said pivoted front axle operates to adjust the fender-shield and the position of the latter relative to the front shield is determined by the position of the axle to the vehicle body, substantially as and for the purposes described.

2. An automatic vehicle fender pivotally mounted upon a front axle and controlled by connections with a vehicle-body or running gear to swing back and forth partially around the circumference of a front wheel as the axle is turned, substantially as and for the purposes described.

3. In an automatic fender, a swinging arm or standard carrying a fender, in combination with a rod connected with said arm or standard and rigidly supported against endwise movement on a vehicle body or running gear to sustain and determine the position of the fender relative to the vehicle wheel to which it is applied, and around the circumference of which it is movable a limited distance, substantially as and for the purposes described.

4. In an automatic vehicle fender, the combination of an arm or standard preferably connected with a part of the vehicle adjacent to the front wheel, a fender carried by said arm or standard, and a rod connected to the arm or standard between the pivot and fender and sustained against endwise movement on a vehicle body or running gear to hold the fender in its adjusted position and to move the same back or forth partly around the circumference of the wheel, substantially as and for the purposes described.

5. In an automatic vehicle wheel fender, the combination of a swinging arm or standard adapted to be pivotally supported on a front axle, a fender carried by the standard, and a rod connected to said arm or standard, and an operating rod connected to the arm or standard at a point between its pivot and the fender, the whole combined and arranged for operation, substantially as and for the purposes described.

6. An automatic fender A for the front wheel of a vehicle carried by a standard or support B which is pivoted upon or to the front vehicle-axle and movable back and forth in a direction around the circumference of the vehicle-wheel, combined with a connecting rod C attached to the arm or support B at a point between its pivot and the fender, and means for attaching the connecting rod to a stationary part of the vehicle-body, substantially as described.

7. The combination with a front axle, and a vehicle body, of the clips D, D', the forked standard having the brace pivoted in said clips, the fender A rigid with the forked arms of the standard, the fixed plate on the vehicle body or running gear, and the rod C connected to said fixed plate and to the standard at a point between the clip and fender, substantially as described.

In testimony whereof I affix my signature in presence of two witnesses.

JAMES M. ELDER.

Witnesses:
 NEWTON TODD,
 ANNA TODD.